United States Patent
Bidarkar et al.

(10) Patent No.: US 10,147,115 B1
(45) Date of Patent: Dec. 4, 2018

(54) DISPLAYING SUPPLEMENTAL MESSAGES INCLUDING ADVERTISEMENTS OR SECURITY NOTIFICATIONS IN A VIRTUAL DESKTOP ENVIRONMENT

(75) Inventors: Rishi Bidarkar, San Jose, CA (US); Banit Agrawal, Sunnyvale, CA (US); Vikram Makhija, Castro Valley, CA (US); Uday Kurkure, Los Altos Hills, CA (US); Jennifer Anderson, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 912 days.

(21) Appl. No.: 13/433,203

(22) Filed: Mar. 28, 2012

(51) Int. Cl.
*G06Q 30/02* (2012.01)

(52) U.S. Cl.
CPC .............................. *G06Q 30/0246* (2013.01)

(58) Field of Classification Search
None
See application file for complete search history.

(56) References Cited

U.S. PATENT DOCUMENTS

| | | | |
|---|---|---|---|
| 2010/0185674 A1* | 7/2010 | Jobs | G06Q 30/02 707/781 |
| 2011/0078726 A1* | 3/2011 | Rosenberg | G06Q 30/02 725/34 |
| 2012/0078720 A1* | 3/2012 | Pappas | G06F 8/38 705/14.55 |

* cited by examiner

*Primary Examiner* — Thomas L Mansfield
*Assistant Examiner* — Amanda Gurski
(74) *Attorney, Agent, or Firm* — Fish & Richardson P.C.

(57) ABSTRACT

Embodiments of a supplemental message display method and system are described. Supplemental messages to be displayed on the client display of a network client are defined and comprise content that is separate from content generated by any application currently executed on the network client. A virtual desktop view is served from a server computer to the network client. The virtualization layer defines a screen region on the virtual desktop view of the client display device through for the display of one or more of the supplemental messages. The virtualization layer controls the size, location, color, and transparency level of the defined screen region. The defined screen region is made persistent to ensure the continual display of the supplemental message. The supplemental message content is provided to the network client and interactive user input is received through the displayed message.

21 Claims, 6 Drawing Sheets

DISPLAYING SUPPLEMENTAL MESSAGES INCLUDING ADVERTISEMENTS OR SECURITY NOTIFICATIONS IN A VIRTUAL DESKTOP ENVIRONMENT

BACKGROUND

In the current Internet and developing cloud computing industry, an increasing number of services are being delivered for free while building on a revenue model that is based on advertising and the delivery of interactive advertising messages. The fast-growing online advertising space, however, is generally controlled and monetized by the advertising content providers that generate and serve the advertising messages through web browser interfaces or through special application programs. This revenue model leaves out the infrastructure vendors, hardware equipment manufacturers and other resource providers that build and service the physical networks and systems through which the advertising messages are transmitted.

One of the models for online advertising is a pull model in which the user launches a web browser on a client computer and views advertisements that are transmitted to the client computer. A great deal of development has been directed to the delivery of targeted advertisements that are tailored to a user based on certain factors, such as location, demographics, usage patterns, and so on. For example, certain advertisement messages are pulled from an advertisement server or content provider, depending on the URL (uniform resource locator) or search term that is entered by the user. The client web browser interprets scripts in the content and then pulls the related advertisement content through the hyperlinks based on the input URL. The advertisement content is often interactive in that it not only displays messages but also includes links that the user can click on to access related websites. This interactivity provides a mechanism through which user actions can be tracked and used as the basis for revenue to be collected. For example, a revenue generating event can be triggered by the user performing an act in response to the displayed advertisement, such as clicking on an embedded hyperlink or purchasing a good or service associated with the advertisement. This present pull model of advertisement serving, however, suffers from certain disadvantages, such as the possible blocking of advertising messages by overlapping display windows, or the filtering of advertising messages by browser settings, spam or pop-up blockers, anti-virus software, and the like.

Another model of delivery advertising content to a client computer is the push model. In contrast to the pull model, the push model involves the serving of advertisement messages directly to a display without any user intervention. The display of advertisement messages on a television is an example of push messaging. The disadvantage of the push model is that the user's lack of control over the delivery of the advertising messages can cause interruptions in process flow and unduly interfere with the user's computing environment and experience. Regardless of the advertising message delivery method, most advertisement messages transmitted over computer networks are tied to a particular application that is running in a web browser, such as an advertisement served by a search engine, or an advertisement message provided as part of a plug-in application. This essentially limits the control and transmission of the advertisement messages to the application providers, and also requires that the user executes a particular application to view an advertisement.

In general, advertising messages represent one type of supplemental or out-of-band content that may be of use to a user. Other types of messages include security messages (e.g., public address warnings or system/network warnings), service notifications (e.g., maintenance or new feature announcements), diagnostic information (e.g., performance metrics or warnings), and so on. These messages are all ancillary or adjunct to the actual information transmitted to or from a user during the course of a web browsing session or other application execution, but they may be of sufficient value to a user that they add value to a third party provider or can viably form the basis of a valid revenue transaction. Such supplemental messages that encompass both advertising and security/service messages have the most value if they are delivered reliably and displayed in a persistent manner such that they are always visible to the user. The displaying of security messages is essential. They should not be blocked. Any impediment to the delivery and/or display of such messages, such as through filters or crowded GUI desktops can greatly limit their utility.

The disadvantages associated with current advertisement serving technology are also present, if not increased, in virtual network environments in which client computers operate virtual desktop systems. Virtualization of computer resources involves the abstraction and sharing of computer hardware among multiple operating systems and applications that are each isolated in corresponding virtual machines (VMs). This allows the hardware to be more efficiently utilized and leveraged by a potentially larger number of simultaneous users. A Virtualized Desktop Infrastructure (VDI) is an architecture where the user's display and input devices are local, but the applications are executed remotely. This architecture allows users to access their applications and data remotely, as the applications are hosted on virtual machines on a remote server. With VDI, users access personal desktops provided by virtual machines running on remote servers over a network connection. Each VM is a complete execution environment, and the server provides a user interface over the network connection so that user inputs and outputs are communicated between the user and the VM.

The virtualization layer can limit the delivery of advertisement and supplemental messages as compared to networks supporting standalone client computers because of the centralization of resources and control of the network nodes. Also, virtualization also introduces added security concerns since traditional network security measures, such as firewalls and Virtual Local Area Networks (VLAN) do not work well in virtualized environments.

SUMMARY OF THE DISCLOSURE

This disclosure is directed to an embodiment of a system and method for displaying supplemental message content on a defined display area within the display of a network client in a virtualized network environment. The display area is transformed using a transformation process to create a defined screen region sufficient to display supplemental message content served by a supplemental message server. The defined screen region may be configured to be persistent, such that content displayed within the defined screen region is always visible to a user of the client. The persistent nature of the defined screen region may be implemented through a non-maskable definition or the display of the defined screen region within a non-accessible area of the client display. The virtualization layer has direct control over the size, location, color, and transparency level of the defined screen region. In one embodiment, there is a logical communication channel from the supplemental message server to the network client to transmit message content to the network client and receive interactive user input through the displayed message.

The disclosure is also directed to an embodiment of a method and system for displaying supplemental messages on a virtual client display, wherein the supplemental messages may include content that is separate from content generated by any application currently being executed on the network client. A virtual desktop server provides a virtual desktop view to be displayed on the client display. The virtual desktop view has a first display area that displays content associated with the application currently executed on the virtual desktop, and a second display area that displays a supplemental message. A server agent defines the characteristics of the second display area and interacts with a display driver process to allow for the persistent display of the supplemental message. A logical communication channel from a separate supplemental message server to the virtual client may be provided to allow the supplemental message server to directly process any interaction between the virtual client user and the supplemental message content.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

Embodiments are directed to the transmission and persistent display of supplemental messages over a computer network in which a virtual desktop server provides graphical desktop content for remote users accessing virtual machine clients running on physical computers implemented through a virtual machine management server. The supplemental messages can include video, still image, or audio content that is transmitted, served, or streamed from a server computer to the client computer over a network. The supplemental messages to be displayed in the defined screen regions can include security tags, identification and security watermarks.

Figure 1:
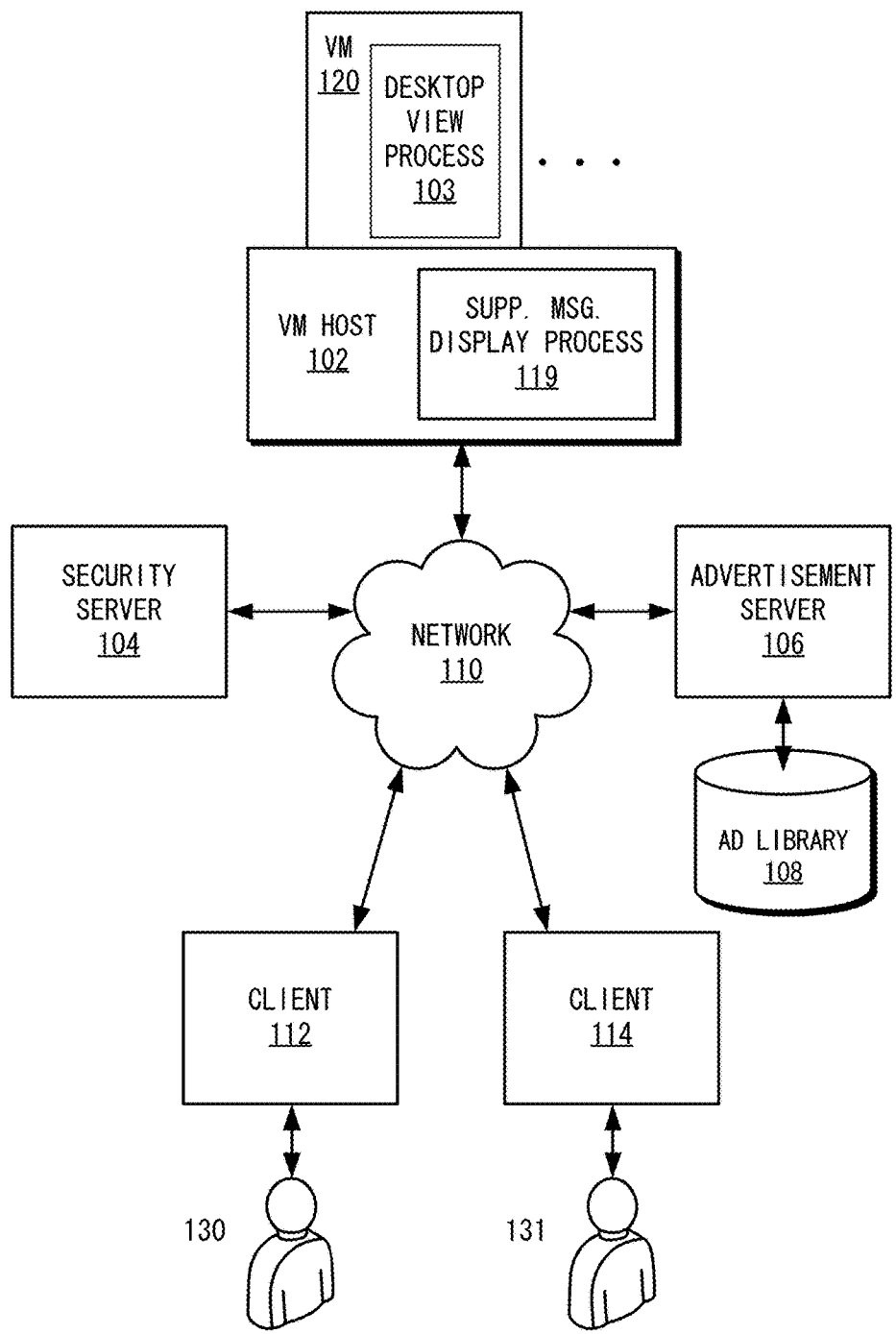
FIG. 1 is a diagram illustrating a virtual network system that implements embodiments of an advertising and supplemental message delivery and display system.

In general, aspects of the one or more embodiments described herein may be implemented on one or more computers executing software instructions. The computers may be networked in a client-server arrangement or similar distributed computer network. In one embodiment, the network is a virtualized network in which hardware and software network resources and functionality are combined using known virtualization techniques. FIG. 1 is a block diagram of a network system that implements embodiments of an advertising and supplemental message delivery and display system. The network system 100 includes one or more remote users 130 and 131 accessing virtual machines (VMs) 120 on a physical computer system embodied in virtual desktop server computer (VM host) 102. The virtual machines allow the sharing of the underlying physical computer resources between different users, application programs, and processes. The virtualization is provided by a software layer called a virtual machine monitor (VMM) or hypervisor. Each user 130 or 131 may access a VM 120 using software running on a thick client 112, such as a desktop computer, laptop, personal digital assistant (PDA) or smart phone. Alternatively, the client may be a thin client 114, which may be embodied as a low-end computer terminal that only provides a graphical user interface to the user and minimal native processing resources and relies on the server or other computer to provide additional functionality.

FIG. 1 illustrates a network that implements a virtual desktop infrastructure (VDI) that provides complete, centrally-managed desktops to remote users through certain computer virtualization techniques. In general, VDI technology is used to create a large number of independent computing environments for a large number of users. In network 100, server 102 executes a desktop view process 103 that provides a virtual desktop to the remote users 130 and 131. The desktop is an interactive user environment provided by a guest operating system and applications running within the VM 120 and generally includes a graphical display, and other outputs such as audio, indicator lamps, tactile feedback, and so on. The desktop also accepts input from the user in the form of device inputs, such as keyboard and mouse input.

Virtual desktop server 102 also executes a supplemental message display process 119 that creates certain persistent (e.g., non-maskable) and customized message display spaces on the virtual desktops displayed by client devices 112 or 114. The supplemental message transmission and display process can be used to transmit supplemental messages, such as advertising messages, security tags, service notification, diagnostic data, configuration information, and other similar information to the remote users. Process 119 defines specific screen regions and known composition data (e.g., individual pixel data values) of displayed content to serve the supplemental messages to the appropriate defined screen regions. Client processes executed on respective client devices use these defined persistent screen regions to display the supplemental messages, such as advertisements or security tags, to the remote users. The persistent nature of the defined screen regions ensures that the security tags, identification watermarks, and other critical messages that should be always visible are always visible, thus enhancing network security and operation. It should be noted that the term "supplemental messages" means any type of message or content that is desired to be served, pushed or transmitted to a client computer from a server computer over a network. Such supplemental message content can include advertising content, security information, service notifications, or any other similar content.

The defined screen regions for the display of advertisements can be made available for service providers to either use or lease to other potential publishers using either push or pull models of advertising delivery by attachment of a logical connection from the client to the third party message server. The system also tracks the content that is displayed, as well as any user interaction with the displayed content. This allows for an accounting of displayed advertisements and a reliable measurement of end user viewing of the advertisements. For such a system, network 110 also includes an advertisement server 106 accessing an advertisement (Ad) library 108 that holds a variety of different advertising messages or other supplemental messages for presentation to the user. Advertisement server 106 can deliver advertising content through network 110, which is then processed by processes within the virtual desktop server 102 and virtual machine 120 for display on the appropriate remote user client device 112 or 114. Likewise, a separate security/service server 104 may provide various items of information or resources associated with the operation of network 110, such as security messages regarding notifications or warnings, and diagnostic or performance messages regarding network service.

Network 110 of FIG. 1 may also include other client devices and servers not shown, such as web servers, that provide services and resources to the client devices 112 or 114 coupled to network 110 or the other servers. Network 110 transfers data among servers and between servers and client devices 112 or 114 using one or more of routers and network interface devices using network transmission techniques known to those of ordinary skill in the art. For an embodiment in which network 110 is the Internet, the servers may execute or utilize a web server processes to provide Hypertext Markup Language (HTML) files, typically in the form of web pages, to client computers coupled to the network. To access the HTML files provided by the servers, a VM process for a client computer may include a web browser process that accesses web pages available through any Internet server site, such as advertisement provider 106 (which may also be a network server executing a web server process).

For purposes of the following description, the supplemental messages displayed on client devices 112 or 114 may be exemplified by video advertisements. It should be understood, however, that the supplemental message may embody any type of user perceivable content or message comprising video, audio, still picture, screen effect, semaphore, or other similar messaging data. Such supplemental messages may be provided for any reason of conceivable utility to the user, such as to provide a message, warning or notification, encourage an action or behavior, to provide a means for user input, or any similar use. The supplemental message content may be served by the virtual desktop server 102 or any other content server in system 100, such as advertisement server 106. The digital data comprising the supplemental message content may be sourced locally within a server, or it may be accessed through a separate data store, such as advertisement library 108. Likewise, although embodiments are described with respect to a virtual desktop system, the embodiments presented can be used in other client-server network environments with a remote display application transmitting display data to a remote client.

Figure 2:
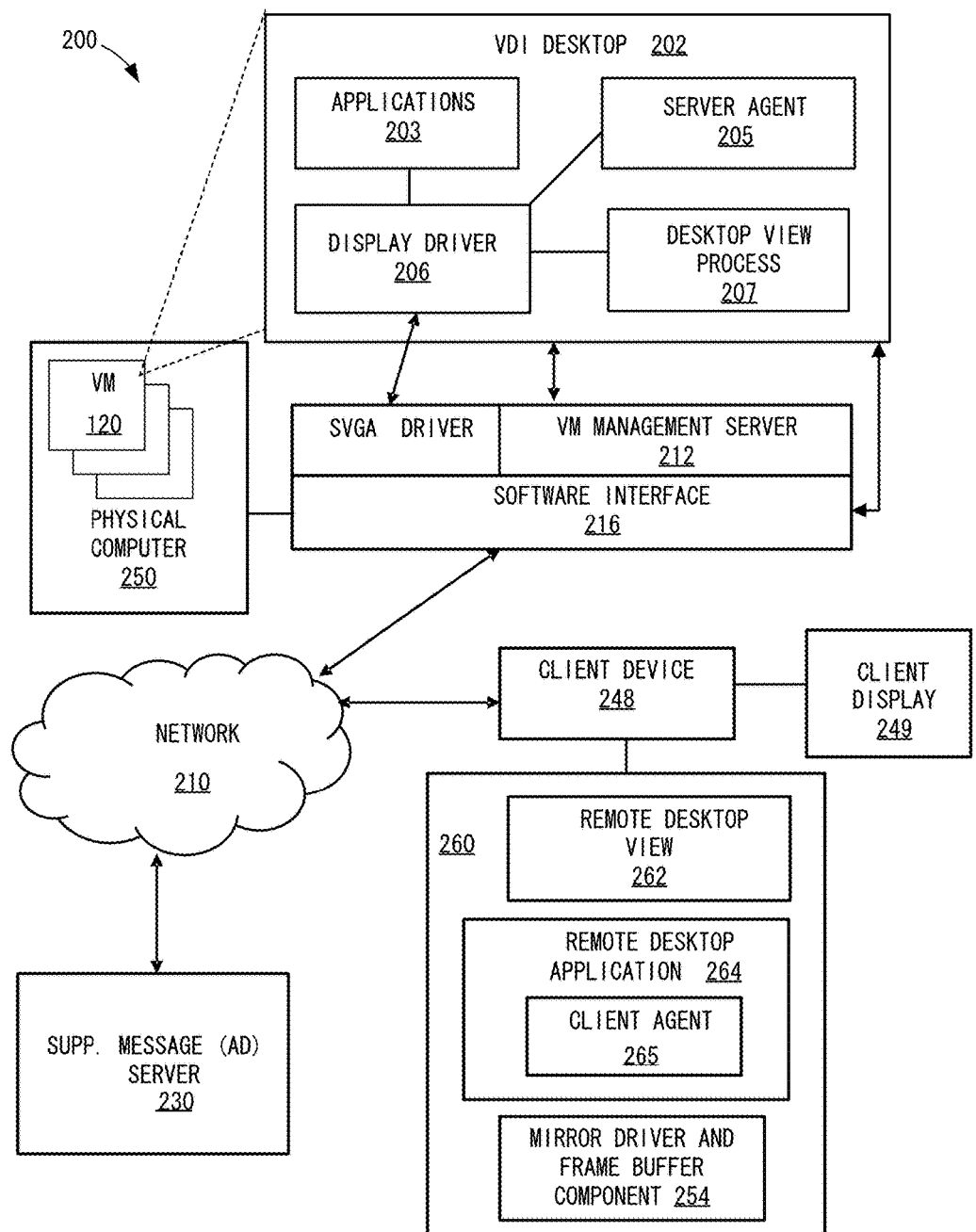
FIG. 2 is a block diagram of a virtual desktop infrastructure having virtual machines running on physical computer systems that implement an advertising and supplemental message delivery and display system, under an embodiment.

FIG. 2 is a block diagram of components of a hosted virtual server and virtual client in a network that implements an advertising and supplemental message delivery and display system, under an embodiment. System 200 of FIG. 2 represents an example of a virtual network environment in which one or more virtual machines 120 supports the operation of client computers, such as client device 248, and is implemented through physical computer hardware 250 embodied within a server computer, such as virtual server 102. Each physical computer 250 includes hardware, virtualization software running on the hardware, and one or more virtual machines 120 executing on the hardware by way of the virtualization software. The virtualization software is logically interposed between, and interfaces with the hardware and the virtual machines. In general, the hardware includes at least one processor, with each processor being an execution unit, or "core," on a microprocessor chip. The hardware may also include system memory, a network interface port (NIC), and other devices, such as non-volatile memory. The virtualization software, which may be referred to as a hypervisor, includes software components for managing hardware resources and software components for virtualizing or emulating system resources for each virtual machine 120. Each virtual machine 120 is an abstraction of a physical computer system and includes an operating system (OS) such as Microsoft Windows® and applications, which are referred to as the "guest OS" and "guest applications," respectively, where the term "guest" indicates that it is a software entity that resides within the VM.

As shown in FIG. 2, Virtual Machine Management Server (VMMS) 212 provides a software interface 216 that, among other things, allows other programs to control the lifecycle of virtual machines 120 running on physical computer 250 that are managed by VMMS 212. Desktop management software interfaces with VMMS 212 using software interface 216 to control the virtual machines 120. The desktop management software creates and maintains a VDI (Virtual Desktop Infrastructure) environment that creates and controls the graphical user interface (GUI) and audio/visual content displayed on the client display 249 that is coupled to or incorporated in client device 248. In an embodiment, the GUI is exported via HTTP and accessed by a commodity web browser running on a VM 120 to cause the appropriate display on client display 249.

In general, the desktop virtualization function provided by the VDI system separates the personal computer (client) desktop environment from a physical machine using a client-server model of computing. The model stores the resulting "virtualized" desktop on a remote central server, instead of on the local storage of a remote client; thus, when users work from their remote desktop client, all of the programs, applications, processes, and data used are kept and run centrally. The VDI system allows the use of virtual machines 120 to let users 130 and 131 maintain individualized desktops on a single, physical computer 250 that may be operated at a data center or similar remote facility. An example VDI system may be implemented using the VMware® View™ product, which is a commercial desktop-virtualization product developed by VMware, Inc.

In an embodiment, VDI desktop 202 includes a display driver 206 that enables the display of supplemental messages on client display 249. Through the virtualization software, virtual machine 120 executes one or more applications 203. Applications 203 may be any computer program that transmits data or acts on data provided to and from a client device 248 or other servers or computers on network 210. Executable files may be accessed by the guest operating system from the virtual disk or virtual memory, which are portions of the actual physical disk or memory allocated to the VM 120, and once an application is installed in a VM, the guest operating system retrieves files from the virtual disk as if they had been pre-stored as the result of a conventional installation of the application.

A desktop view process 207 executed on the virtual desktop server controls the screen area of client devices 248.

Graphical data for display on client 248 is usually exclusively provided by the one or more applications 203, along with certain pre-defined, common GUI elements, such as display window borders, taskbars, and the like. This graphical data is processed through desktop view process 207 that defines certain attributes associated with the control of a client display 249 that is coupled to client device 248. During normal operation, the desktop view process 207 provides control over the full screen area of client display 249, such as defining display areas within the screen, assigning attributes to these screen areas, and so on.

In an embodiment, one or more processes of VDI desktop 202 further control the desktop GUI to allow for the display of out-of-band data not associated with applications 203, and that may be provided by other data servers, such as supplemental message server (e.g., advertisement server 106 or security server 104) 230. A server agent 205 defines certain persistent screen regions within the virtual desktop environment of the client display 249 for the presentation of the supplemental message to the user. In an embodiment, the supplemental message space is enabled by utilizing a stack of a display driver 206 of the virtualization layer. This supplemental message space can be visible either on the existing display area defined by the GUI or it may be visible in a border or "scale-out" screen area created when the GUI display area is resized to less than the entire available space of a screen of client display 249. In an embodiment, the supplemental message transmission and display process utilizes a watermarking technology that has been developed for a virtualized server to notify a client device 248 of particular events. The watermarks are specific regions of the screen of client display 249 that can be made hidden or always visible through the use of non-maskable area definitions.

Server agent 205 of VDI desktop 202 includes a VM screen region process (not shown) that designates specific regions of client display 249 as reserved for the display of supplemental messages apart from any native GUI screen elements and graphic data provided by applications 203. The screen regions may be defined such that a supplemental message is displayed as a unitary message in a dedicated display area, that is, as a standalone video or image; or it may be defined and displayed as an overlay, such as a semi-transparent image displayed over another image, or as a carve-out or sub-window within another display window. The defined screen regions are also assigned certain attributes. These attributes include the size, shape and position of the screen regions within the client display, as well as the maskability of the content within the display area. In one implementation, the screen regions dedicated to the display of supplemental messages are made non-maskable. Alternatively, they may be defined as regions within a scale-out area of client display 249 that is unknown or recognized as a non-accessible border area by display driver 206. This ensures that advertisements, security tags or important service notifications will always be visible on the client display 249.

In an embodiment, server agent 205 interacts with display driver 206 to define and serve the supplemental message display areas. Display driver 206 may be a proprietary SVGA (Super Video Graphics Array) driver for controlling the virtual video card in the virtual desktop. Alternatively, it may be a modified version of a known driver that is configured to operate with the VDI system of network 210. Display driver 206 processes graphic data provided by applications 203 for display as normal in one or more of the GUI defined display windows set up by desktop view process 207. Display driver 206 also interacts with server agent 205 to cause the display of any supplemental message data within the defined screen regions set up by server agent 205 for the display of such supplemental messages.

Display driver 206 may display the supplemental message content as the last displayed content during screen refresh or display operation. In general, display content includes different components of graphical data such as GUI templates, data from a first application displayed in a first window, data from a second application displayed in a second window, and so on. Although such data may appear to be composited and displayed simultaneously or near simultaneously, display driver 206 is actually serving the data serially to client display 249. The last or most recent processed data is usually displayed over any previously processed data. In an embodiment, display driver 206 is configured to display the supplemental message data last during any single screen refresh cycle so that the screen region defined for the supplemental data is always displayed over any application or GUI defined window. In this manner, the supplemental data is persistent and not blocked by any other graphic data that may be served by display driver 206.

In an alternative embodiment, desktop view process 207 may be configured to define the supplemental screen regions within a scale-out area of the client display 249. For this embodiment, the GUI screen area may be resized to occupy less than the entire available screen display area. The remaining border area is a scale-out area that is not accessible by the applications. Within this area, server agent 205 defines one or more supplemental display areas. Display driver 206 is configured to serve supplemental message content to these scale-out supplemental display areas, and because such display areas cannot be accessed or overwritten by any application or GUI process, they are effectively persistent with respect to whatever is displayed in the normal GUI screen area. Such an embodiment is discussed further in relation to FIG. 4A below.

In a further alternative embodiment, the supplemental message display areas defined by server agent 205 may be marked or designated as non-maskable display areas. This may be accomplished by certain definitions provided by display driver 206 or processes within server agent 205. Marking a display area non-maskable prevents any other graphical data from overwriting or interfering with the supplemental message data. For this embodiment the normal GUI screen area may comprise the entire available screen area, a process of server agent 205 may analyze this screen area to determine whether space is available for the definition of the defined non-maskable screen regions. Pixel data for the GUI elements (e.g., border, display windows, toolbars, and so on) are processed and recognized by server agent 205, and the defined screen regions are set up to minimally interfere with such already dedicated display elements. In this manner, the non-maskable screen regions for the supplemental messages are made persistent and minimally impact the display of normal application 203 data. Such an embodiment is discussed further in relation to FIG. 4B below.

In order to define the screen regions that display the supplemental messages, server agent 205 may apply certain scaling and translation processes to create the space for the defined screen regions. The screen region display areas can be scaled to an appropriate size to display the served image or video. In an embodiment, an affine geometric transformation process is used. An affine transformation is a class of linear two-dimensional geometric transformation that maps variables, such as pixel intensity values located at a position in an input image, into new variables in an output image by applying a linear combination of translation, rotation, scaling and/or shearing operations. The defined display area may also incorporate or be generated by other transformation functions, such as color transforms, alpha-blending (for transparency), and so on. In an embodiment, the supplemental message may be provided, at least in part as a translucent data object created using the known technique of alpha blending. Alpha blending is a technique which can be used when computer graphics are laid on top of each other and one or more of the objects contain a transparent, or semi-transparent, portion. It ensures that the pixels of the graphic which are underneath a transparent area are visible through it and that their color or brightness is adjusted according to the degree of transparency of the upper object.

For the embodiment illustrated in FIG. 2, supplemental message content, such as advertising messages (video, audio or digital images), or security/service notifications is transmitted to client device 248 and displayed within the persistent screen regions defined by server agent 205. The supplemental or advertisement messages may be sourced by the virtual machine server or by a separate server, such as advertising server 230, or any computer coupled to network 210.

As shown in system 200, client device 248 is coupled to display device 249 (screen or monitor) that provides graphical display output to the user. Client device 248 includes certain modules 260 that may be implemented as executable software programs, and that enable the display of the supplemental message on the client display 249 in a persistent manner. Modules 260 interact with display driver 206 and desktop view process 207 to provide, in a single display device, a display area that provides a virtual desktop GUI display and a display area for supplemental or out-of-band messages related to the VM or any other server (e.g., server 230). Modules 260 include a remote desktop view process 262 that processes the video signals generated by desktop view process 207 on the server. The supplemental message data that is displayed on client display 249 may be composited on the server computer within VDI desktop view 202 on VM 120 and served to client device 248, or it may be composited directly on client device 248.

In an embodiment, desktop view process 207 and display driver 206 send the pixel data comprising the supplemental message to the VM management server 212. A VM console process may be provided that overlays other images onto those pixels through a server process. In an embodiment, the VM console process implements aspects of a watermarking technology in which each frame of a video clip is encoded with video metadata. This watermarking function can be implemented through a process executed in the VM management server 212 layer, display driver 206, or the VM console process of VM 120. Aspects of such a watermarking process are described in U.S. Patent Application Publication No. 2010/0162338 ("Measuring Remote Video Playback Performance with Embedded Encoded Pixels," Published 24 Jun. 2010), which is incorporated herein by reference. For this embodiment, the supplemental message data is composited on the server computer (e.g., server 102) implementing the VM 120. In this case, the supplemental message data for display on client display 249 is composited on the server computer serving the VDI desktop 202. Display components within the client device 248, such as mirror driver and frame buffer component 254 receives this composited data and causes the supplemental message to be properly displayed on display 249.

In an alternative embodiment, the supplemental message displayed in the defined screen regions set up by server agent 205 may be composited locally on client device 248. In this case, the graphical data for the supplemental message is transmitted by desktop view process 207 to client device 248 in a redirection operation. A client agent 265 within the remote desktop application 264 executed on client device 248 composites the supplemental message and causes it to be displayed along with the normal application and GUI graphics on the client display 249. The compositing of the supplemental message on client device 248 allows for the display of such messages during certain idle or inactive periods, such as when the server is booting up and display driver 206 is not powered up and is not capable of compositing any images. In this case, the client and advertisement server computers may already be operating, and supplemental message data transmitted by the advertisement server is passed directly through server agent 205 to remote desktop application 264 for compositing and display on the client display 249.

Figure 3:
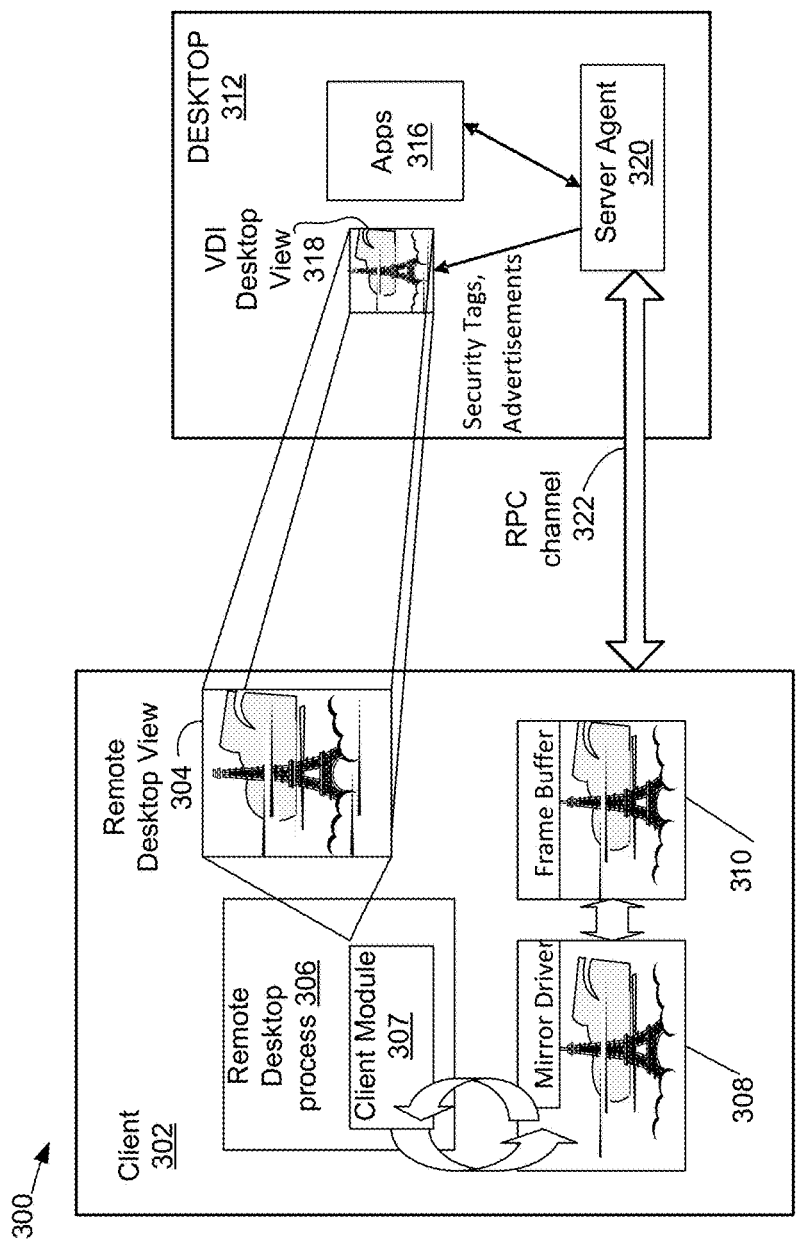
FIG. 3 illustrates the transmission and display of a supplemental message from a virtual desktop server to a client in a virtual network environment, under an embodiment.

FIG. 3 is a diagram illustrating the interaction of virtual server and client modules to transmit and display supplemental messages on a client display, under an embodiment. As shown in system 300, virtual server 312 generates a virtual desktop view 318 of a video display that is transferred to client 302. Desktop view 318 may be generated by a desktop view process that works in conjunction with a display driver 206, as shown in FIG. 2. Certain content for the desktop view 318 may be provided by one or more applications 316. This content may comprise the primary content shown on the client 302 during a normal application execution session or web browsing session. Supplemental content, such as advertisements or security messages (tags) may be sourced by other applications or other servers. This content is provided to the desktop view process and/or the application 316 by a server agent 320 within virtual server 312. Server agent 320 is configured to open a port that receives supplemental message content from the supplemental message server and interact with the display driver to render the supplemental message on the client display.

The server agent 320 also communicates directly with remote client 302 to transfer the content data over a remote protocol communication (RPC) channel 322. RPC channel 322 may also be used by the client 302 to send display information to the server regarding data or settings regarding the display device (make, manufacture, size, etc.) and/or it may be used to transmit user input information from client 302 to server 312. RPC channel 322 may employ any appropriate proprietary or known messaging protocol, such as PC over IP (PCoIP™) and the like.

As shown in FIG. 3, a remote desktop process 306 generates a remote desktop view 304 that is displayed on a client display and that corresponds to the image generated by desktop view process 318 at the virtual server 312. At client 302, a frame buffer 310 drives a video display using a memory buffer containing a complete frame of data for the client's remote desktop view 304. The information in the buffer may include color values for every pixel on the screen. Color values are commonly stored in 1-bit monochrome, 4-bit palletized, 8-bit palletized, 16-bit highcolor and 24 bit truecolor formats. Mirror driver 308 includes a mirror buffer that holds a copy in memory of frame buffer 310 to lower the amount of processing required by the video tracker to scan for encoded pixels. Display mirroring technology is widely employed by remote desktop applications such as NetMeeting, PC Anywhere, VNC, Webex, and so on. In general, mirroring performs better than primitive screen grabbing because mirroring allows the capture of only the updated regions of the display and retrieves data directly, bypassing the intermediate copy. In an embodiment, a mirror buffer such as DFMirage for the Windows NT OS family is used. DFMirage is a driver for a virtual video device managed at the DDML (Document Definition Markup Language) level of the graphics system that exactly mirrors the drawing operations of one or more physical display devices. In another embodiment, a video tracker can be used to inspect frame buffer 310 directly without using a mirror buffer.

In general, mirror driver 308 simply mirrors the frame buffer 310 and acts as a fork process that reproduces what the frame buffer receives. Frame buffer 310 is used by the watermarking process and provides a means by which hooks or markers can be placed in the video stream displayed in the remote desktop view 304. In an embodiment, remote desktop process 306 includes a client module 307 that polls mirror driver 308 to track what is captured in the mirror buffer. In an alternative embodiment, instead of using a mirror buffer the mirror driver function can be implemented by an application that captures events, such as the SVGA device tap process may be used to capture and track what is received by the frame buffer.

Referring back to FIG. 2, once the supplemental message is composited and displayed on client display 249, client agent 265 is configured to facilitate certain interactivity with respect to message displays and interaction between client 260 and server 230. Client agent 265 allows messages to pop-up and display on client display 249, and it also provides a logically independent communication process by which the supplemental message display area can be interacted with by the user. For example, if the supplemental message includes a hyperlink, the client agent provides a mechanism that allows a user clicking on the hyperlink to access the advertisement server 230 website directly. The logically independent communication channel in an embodiment is illustrated in FIG. 3 as RPC channel 322. In other embodiments, the interaction may be facilitated through computer 250. For example, computer 250 may forward any interactions to advertisement server 230.

For one embodiment, client agent 265 of client modules 260 accesses a supplemental message server, such as advertisement server 230 through a logical communication channel that is separate from the VM network path that goes through VMM 212. This logical communication channel generally supports features such as multimedia redirection that allows content to be delivered to the client through the virtual machine infrastructure or directly from a third party source, such as server 230. RPC channel 322 may thus implement a protocol that is different than or supplemental to the standard network 210 protocols, and forms a remote protocol channel that is separate from the VM infrastructure communication channels.

In an embodiment the supplemental message comprises an advertisement or any message that is provided as video data. The video may be encoded before being transmitted over network 210 and transmitted using different video encoding methods and protocols, such as Remote Desktop Protocol (RDP) for computers running Microsoft Terminal Services; multimedia streaming technologies such as Adobe Flash®, Microsoft Silverlight, and Digital Multimedia Broadcasting (DMB); and digital TV signal transmission protocols, such as Digital Video Broadcasting (DVB), Digital Terrestrial Television (DTT), and so on. The advertising content may also comprise audio content along with the video content, or it may comprise purely audio content, such as a spoken message. In general, the Remote Desktop Protocol is a multichannel capable protocol that supports separate virtual channels for carrying presentation data, serial device communication, licensing information, or encrypted user input data, and so on. In one embodiment, the video data is transmitting using the RDP display channel. In many cases, the display channel is the only channel that reaches the client machines because of firewalls and other obstacles between servers and clients. Additionally, the embodiments presented are independent of the communication protocols used to transfer display data.

Figure 4A:
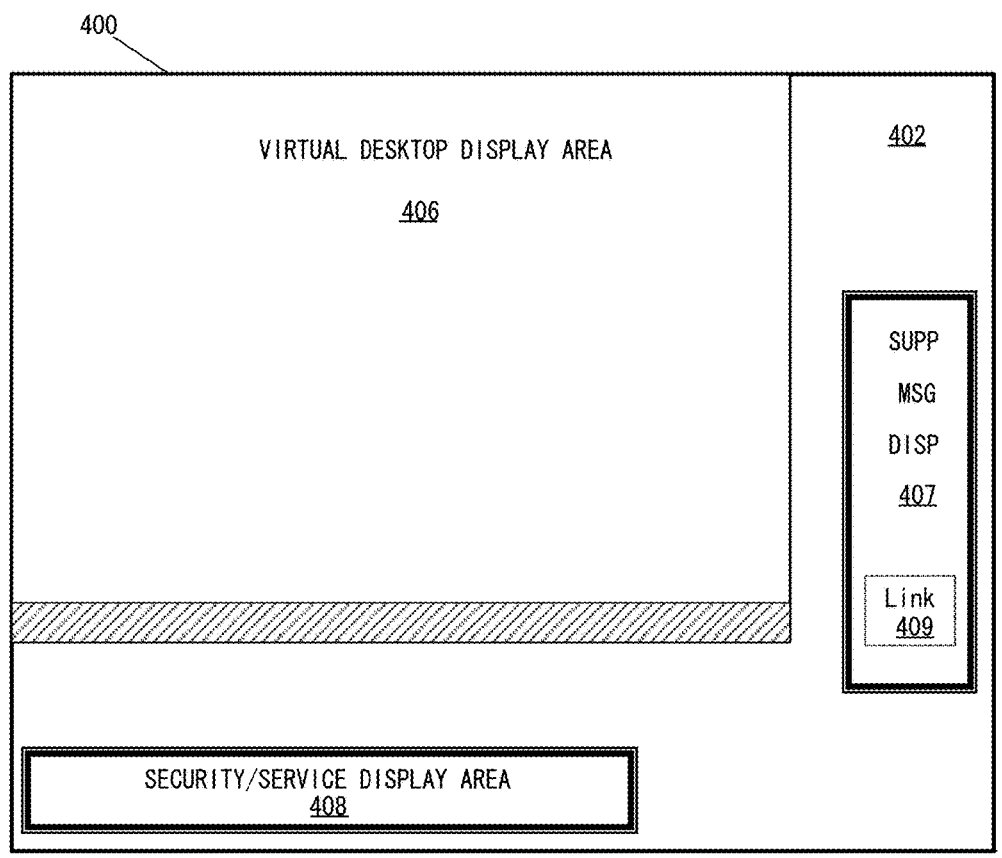
FIG. 4A illustrates an example of defined screen regions for the display of supplemental messages on a network client display device, under an embodiment.

FIG. 4A illustrates an example of defined supplemental message screen regions displayed on a display device of a client device, under an embodiment. Display screen 400 of the client display device is divided into a virtual desktop display area 406 for the desktop GUI and any remaining unused screen area. During normal operation, the VDI display area 406 can either occupy the entire screen area 402 if the system is in full-screen mode, or a portion of screen area 402 if the system is in windows mode. The embodiment of FIG. 4A illustrates a case in which the VDI desktop display area 406 has been resized to occupy less than the entire screen 400 area. The remaining area 407 of the screen 400 (i.e., outside of region 406) is a scale-out region that is not seen by any of the applications. These areas represent border areas that is defined by the display device circuitry, such as in hardware or firmware device drivers, and not by guest or host operating systems or applications. This scale-out area is non-maskable by definition as it is outside the access of the applications 203. Server agent 205 defines certain supplemental 407 and 408 within this scale-out region 402 for the display of supplemental display messages, such as a link 409. Since these messages are displayed within the scale-out region, 402, they cannot be overwritten or interfered with by any application or GUI graphics displayed within normal display region 406.

Figure 4B:
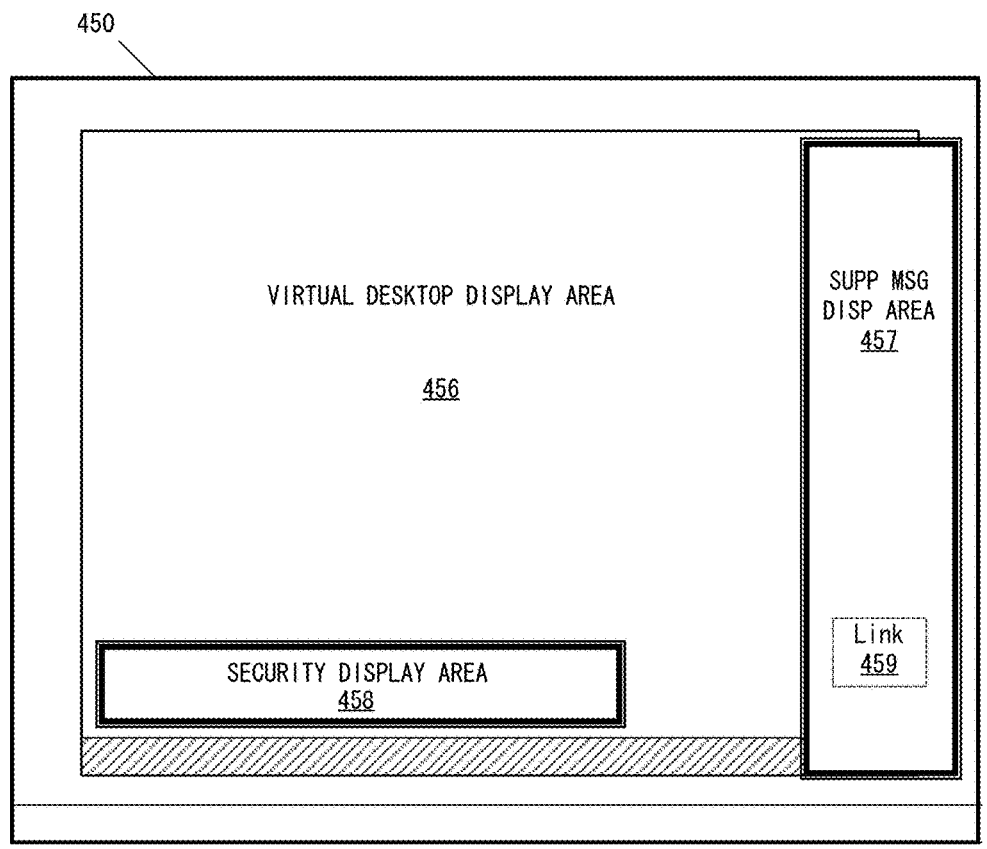
FIG. 4B illustrates an example of defined supplemental message screen regions displayed on a display device of a client device, under an alternative embodiment

The defined screen region or regions may also be implemented in the form of non-maskable screen regions displayed over the VDI desktop GUI. In this case, the non-maskability function of the defined screen region in the virtualization layer of the system is used to reserve certain areas within the actual display area of the client screen that are normally used to display content. The non-maskable attribute is set by restricting the transmission of pixels to the defined screen region. FIG. 4B illustrates an example of defined supplemental message screen regions displayed on a display device of a client device, under an alternative embodiment in which non-maskable screen regions are defined. As shown in FIG. 4B, a majority of the display screen 450 is a desktop display area 456 that displays the VDI GUI and application graphics. Defined screen regions 457 and 458 are reserved for the display of the supplemental messages. These defined screen regions 457 and 458 are designated as non-maskable areas, so that once they are defined they cannot be resized, covered, or otherwise blanked out. Alternatively, defined screen regions 457 and 458 may be effectively non-maskable due to their being rendered as the last windows in any screen refresh cycle by display driver 206. As such they are always displayed over the underlying desktop display area 456.

The dimensions, size, shape, orientation, and location of the supplemental display areas shown in FIGS. 4A and 4B are defined by server agent 205 executed on computer 250. For example, the supplemental screen regions can be provided as overlay windows, sidebars, or scale-out windows of any appropriate size depending on the supplemental content. In an embodiment, the size and location of the supplemental display areas can be altered to at least some extent by the user. For example, the display area may be able to be minimized to a certain size, but not eliminated entirely, or moved from a central screen location to the side or corner of the screen. Different size and shape screen regions may be defined for certain types of messages. For example, narrow or small sidebar areas 408 or 458 displayed along the horizontal or vertical borders of the screen may be used for security alerts, while larger more central regions 407 or 457 may be reserved for ads or other similar supplemental content.

As stated above, the definition of certain screen regions allows defined screen areas to be leased or made available to a third party. This configuration of the defined screen regions can be defined at least in part by the third party, and can then be populated directly with supplemental message data provided by the third party server. In this case, the supplemental message content is acquired from a network port, such as RPC channel 322. Attaching a network port to the defined client screen region makes the content in this screen region customizable in real time. The real time content of a message is defined by the advertiser or supplemental (third party) content provider and is streamed directly into the defined screen region without requiring any interaction or validation by either computer 250 or client device 248. Indeed, a separate RPC channel 322 means that computer 250 and client 248 may not have any knowledge about, and cannot interfere with the display of messages in the defined screen region. The supplemental message provider can define the destination of a message, the source of a message, its criticality, and other similar parameters such as, duration, display mode (continuous/flashing), and the like. The non-maskability of the defined region can also be defined by the supplemental message provider. For example, in a desktop as a service (DaaS) environment, in which a client display environment is provided free of use to a user in exchange for the display of advertisements, the defined screen regions may be made always non-maskable and of a certain minimum size to ensure that a sponsoring adverting company's messages are always adequately visible. In another environment, certain user control of supplemental message viewing may be allowed.

The defined screen regions can also include user input mechanism, such as through command buttons, mouse clickable icons or hyperlinks. A pop-up browser may be connected to the advertisement server, and can be activated to get more content associated with the displayed message. User interaction on the screen regions can be tracked in computer 250 or a separate server (e.g., server 106 or 104 in FIG. 1) and this information can be provided back to advertisement server 230 or other server.

As stated previously, the supplemental message displayed in a defined screen region may comprise an advertising message that is displayed or played to a user through digital images or video, and that is served by an advertisement server 230 on the network. The supplemental message may also include a service notification message generated by a network administrator or computer 250 itself. The supplemental message may yet also include a security tag that encodes certain security related data. The security related data may apply to the network and/or network equipment itself, or it may apply to the user and his or her environment. In the context of network operations, a security tag may include a data element that defines certain access rights to an associated file. This includes usage rights, network routing information, time information (e.g., message lifetime), and so on. Such a data object may not be made visible to the user through display within a defined screen region, but may instead be associated with or appended to message data transmitted to the user through the client display device.

Figure 5:
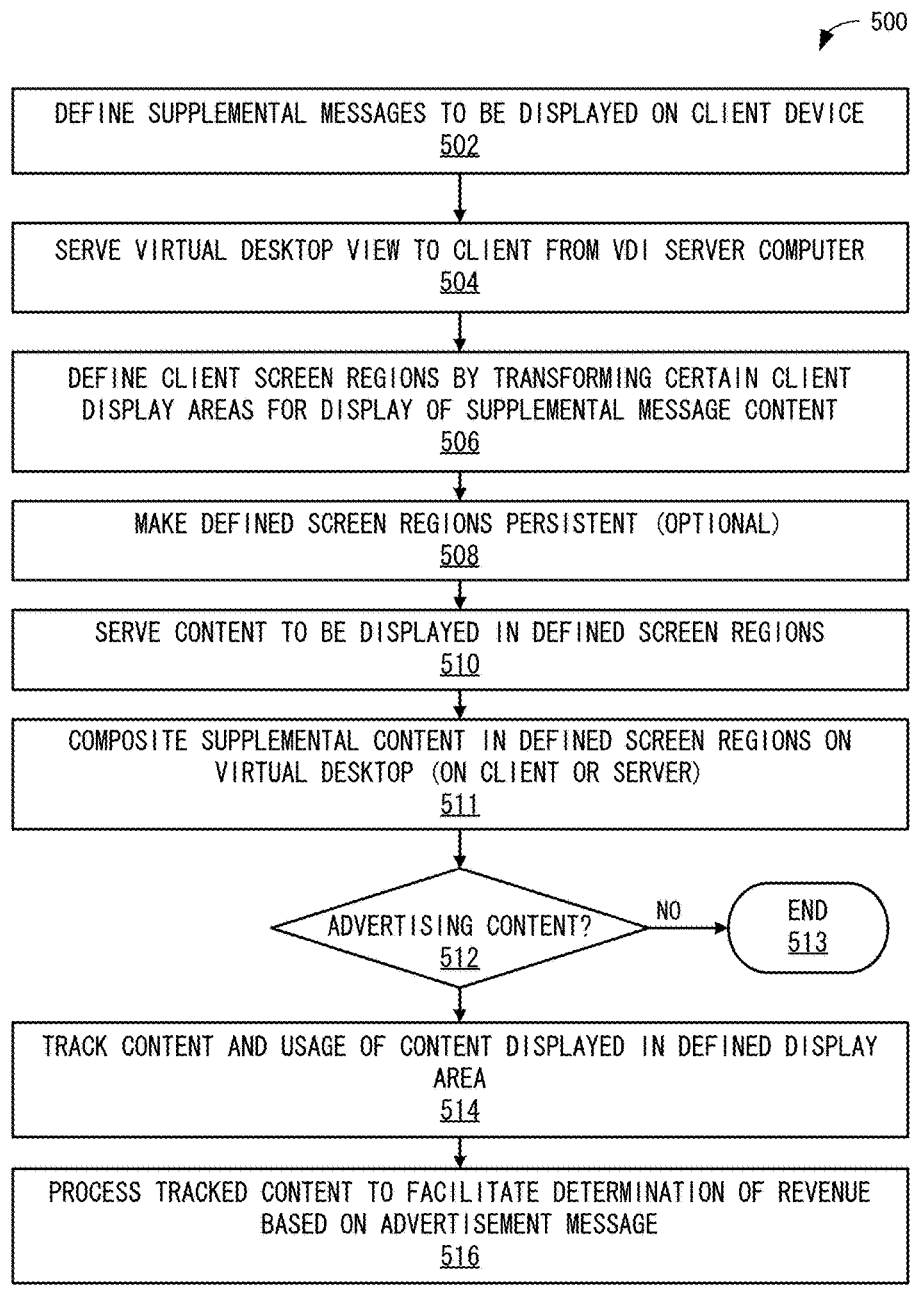
FIG. 5 is a flow chart diagram illustrating a process of transmitting and displaying supplemental messages over a virtual network, under an embodiment.

FIG. 5 is a flow chart diagram 500 illustrating a process of transmitting and displaying supplemental messages over a virtual network, and as implanted through a virtual network environment such as that shown in FIG. 2, under an embodiment. In block 502 a supplemental message provider defines the messages that are to be displayed on client device 248. The messages may be any type of multimedia content comprising audio, video, still image data or any combination thereof. The content may comprise content that is to be perceived or consumed by the user, such as a video or audio message, or it may be interactive content that requires or allows the user to act on the content, such as through mouse-click actions.

In block 504 desktop view process 207 serves a virtual desktop view to be displayed on the client display. Certain screen regions on the virtual desktop view of the client display 249 are then defined through a transformation process that marks out the size, shape and properties of these defined screen regions for the display of the supplemental messages, block 506. In an embodiment, these screen regions are defined by server agent 205 executed on computer 250. The defined screen region may be made persistent through certain non-maskable definitions or through the display of the defined screen region in scale-out areas or as the last displayed area of a screen during any screen refresh period. Thus, in optional block 508, server agent 205 interacts with display driver 206 to make the defined screen regions persistent to ensure the constant display of supplemental messages. In an alternative embodiment, the defined screen regions may be non-persistent. In this case, the process block 508 is not performed, and the defined screen region from block 506 remains non-persistent. In block 510, the supplemental content provider then serves the supplemental message content to be displayed in the defined screen region.

In an embodiment, the supplemental content may comprise a non-interactive message that is simply meant to be displayed on client device 248 for a certain period of time, or indefinitely. In this case, the serving of the message and display of the message in the defined screen region completes the process, block 513. In certain other embodiments, the supplemental message may be an advertising message that is meant to generate revenue or illicit an action from the user, or it may be a service/security notification that requires certain defined action by the user. In block 512, it is determined whether or not the supplemental message is advertising content, or similar content that requires user input or tracking of user action. In block 514, the content and usage or user reaction to the content is tracked. This data can then be used for further processing to generate follow-on messages or network actions. In the context of advertisement serving applications, the tracked usage of the advertising messages can be used to facilitate the determination of revenue based on the displayed advertisement message, block 516. In the case where the defined screen region is leased to an advertisement server, this provides a mechanism whereby advertising revenue can be paid directly to a third party server without implicating any of the traditional sources of advertisement messages, such as web browsers, application programs or search engines.

Through the method illustrated in FIG. 5, the defined screen regions represent dedicated areas that are not tied to any particular application program or web browser. As such, they can be leveraged by any third party supplier to provide messages to the user. The virtual network environment allows the definition of such dedicated screen regions through the use of a virtual desktop infrastructure that sets up the client display with respect to the virtual server, the client-side screen region definition process, and the logical network channel and protocol between the client and the third party message provider.

Although embodiments have been described with respect to implementation in a virtualized network environment wherein at least one of the server computers and/or client computers comprises a virtual machine, it should be understood that alternative embodiments of the supplemental message delivery and display process may be implemented on other types of network infrastructures. For example, any of the network server computers may be coupled, directly or indirectly, to the one or more network client computers through a non-virtualized network that may be the Internet, a Wide Area Network (WAN), a Local Area Network (LAN), or any combination thereof. The network interface between server and client computers may include one or more routers that serve to buffer and route the data transmitted between the server and client computers.

The systems and methods described herein include and/or run under and/or are in association with a processing system. The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination. The terms "process," "module," or "component" generally refers to functionality that is embodied in one or more software programs, by may also refer to functionality that is implemented through a combination of software and hardware, such as firmware. In addition, as used herein, the term "data object" refers to any entity that can be manipulated by the commands of a programming language, such as a value or data structure that represents an element that is displayed, played back or otherwise manifested on a client computer or other processing device.

Aspects of the video transmission system described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects of the method include: microcontrollers with memory (such as EEPROM), embedded microprocessors, firmware, software, etc. Furthermore, aspects of the described method may be embodied in microprocessors having software-based circuit emulation, discrete logic (sequential and combinatorial), custom devices, fuzzy (neural) logic, quantum devices, and hybrids of any of the above device types.

It should also be noted that the various functions disclosed herein may be provided as instructions embodied in various machine-readable or computer-readable media. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the supplemental content transmission and display method and system is not intended to be exhaustive or to limit the embodiments to the precise form or instructions disclosed. While specific embodiments of, and examples for, the described system are described herein for illustrative purposes, various equivalent modifications are possible within the scope of the described embodiments, as those skilled in the relevant art will recognize. The elements and acts of the various embodiments described above can be combined to provide further embodiments. These and other changes can be made to the described embodiments in light of the above detailed description.

In general, in any following claims, the terms used should not be construed to limit the described system to the specific embodiments disclosed in the specification and the claims, but should be construed to include all operations or processes that operate under the claims. Accordingly, the described system is not limited by the disclosure, but instead the scope of the recited method is to be determined entirely by the claims.

What is claimed is:

1. A method of displaying supplemental message content on a client display in a virtualized network environment, comprising:

providing a desktop display area for a virtual desktop environment to display a remote desktop view including application content from a set of applications running on a virtual infrastructure desktop server, wherein a desktop view process running on the virtual infrastructure desktop server is granted control over the client display, and wherein the desktop display area is transmitted to a client device for display in a remote desktop according to a remoting protocol;

responsive to allowing supplemental message content to the user, transforming, by the desktop view process using the control, the remote desktop view within the desktop display area provided to the client display using an affine transformation process that includes one or more of scaling and translation processes to reduce the remote desktop view to create a defined screen region by defining attributes for the defined screen region, wherein the defined screen region is reserved to display supplemental message content that is served by a supplemental message server apart from application content from the set of applications, wherein creating the defined screen region comprises:
- resizing a graphical user interface display area of the remote desktop view for providing the display of application content specified by the desktop view process for the client display according to the affine transformation process to occupy less than the entire available desktop display area to generate a scale-out display area within the desktop display area and outside of the remote desktop view that is not accessible to the set of applications; and
- rendering the defined screen region within the scale-out display area, the defined screen region being associated with a particular channel for directly receiving the supplemental message content;

upon creating the defined screen region, configuring a display driver to make the defined screen region be persistent by communicating the attributes for the defined screen region by the desktop view process to the display driver;

causing, using the display driver, display of an image of application content from an application in the set of applications running on the desktop server for display in the remote desktop view of the desktop display area in the remote desktop of the client display of a network client; and causing, using the display driver, display of the supplemental message content for display in the defined screen region in the remote desktop of the client display of the network client, wherein the display driver is configured to cause display of the supplemental message content such that the application content does not block the supplemental message content by using the attributes of the defined screen region that were provided by the desktop view process.

2. The method of claim 1 wherein the defined screen region is configured to be persistent as a non-maskable screen region.

3. The method of claim 1 wherein the supplemental message server comprises an advertising server, and the supplemental message content comprises an online advertisement.

4. The method of claim 3 further comprising:
- tracking usage of the online advertisement displayed within the defined screen region; and
- processing the tracked usage to determine a monetary value for a content provider operating the advertising server.

5. The method of claim 1 wherein the supplemental message content comprises one of: a video advertising message, a static advertising message, an audio file, a service notification message, identification watermark, and a security tag.

6. The method of claim 5 wherein the security tag comprises a program code dictating one of routing definitions for the supplemental message and usage definitions for the supplemental message.

7. The method of claim 1 wherein the defined screen region is displayed on the client display within a portion of the virtual desktop environment served to the network client by the virtual desktop infrastructure server over a network.

8. The method of claim 7 wherein the supplemental message content comprises content solely generated by the supplemental message server and is separate from the application content generated by the application that is currently executed on the network client and any other content served to the network client from the virtual desktop infrastructure server.

9. The method of claim 8 wherein the defined screen region and the supplemental message content are composited on the virtual desktop infrastructure server with other content for the desktop display area and served to the network client for display.

10. The method of claim 8 wherein the defined screen region and the supplemental message content are composited on the network client.

11. The method of claim 7 wherein the supplemental message content is provided by a supplemental message server that is coupled to the network client via a communication channel different from a communication channel in which virtual desktop infrastructure server is using in configuring the defined screen region.

12. A non-transitory computer-readable storage medium containing instructions for displaying supplemental message content on a client display in a virtualized network environment, wherein the instructions, when executed, control a computer system to be configured for:

providing a desktop display area for a virtual desktop environment to display a remote desktop view including application content from a set of applications running on a virtual infrastructure desktop server, wherein a desktop view process running on the virtual infrastructure desktop server is granted control over the client display, and wherein the desktop display area is transmitted to the client for display in a remote desktop according to a remoting protocol;

responsive to allowing supplemental message content to the user, transforming, by the desktop view process using the control, the remote desktop view within the desktop display area provided to the client display using an affine transformation process that includes one or more of scaling and translation processes to reduce the remote desktop view to create a defined screen region by defining attributes for the defined screen region, wherein the defined screen region is reserved to display supplemental message content that is served by a supplemental message server apart from application content from the set of applications, wherein creating the defined screen region comprises:
- resizing a graphical user interface display area of the remote desktop view for providing the display of application content specified by the desktop view process for the client display according to the affine transformation process to occupy less than the entire available desktop display area to generate a scale-out display area within the desktop display area and outside of the remote desktop view that is not accessible to the set of applications; and
- rendering the defined screen region within the scale-out display area, the defined screen region being associated with a particular channel for directly receiving the supplemental message content;

upon creating the defined screen region, configuring a display driver to make the defined screen region be persistent by communicating the attributes for the defined screen region by the desktop view process to the display driver;

causing, using the display driver, display of an image of application content from an application in the set of applications running on the desktop server for display in the remote desktop view of the desktop display area in the remote desktop of the client display of a network client; and causing, using the display driver, display of the supplemental message content for display in the defined screen region in the remote desktop of the client display of the network client, wherein the display driver is configured to cause display of the supplemental message content such that the application content does not block the supplemental message content by using the attributes of the defined screen region that were provided by the desktop view process.

13. The non-transitory computer-readable storage medium of claim 12 wherein the defined screen region is configured to be persistent as a non-maskable screen region.

14. The non-transitory computer-readable storage medium of claim 12 wherein the supplemental message server comprises an advertising server, and the supplemental message content comprises an online advertisement.

15. The non-transitory computer-readable storage medium of claim 14 further comprising:
   tracking usage of the online advertisement displayed within the defined screen region; and
   processing the tracked usage to determine a monetary value for a content provider operating the advertising server.

16. The non-transitory computer-readable storage medium of claim 12 wherein the defined screen region is displayed on the client display within a portion of the virtual desktop environment served to the network client by the virtual desktop infrastructure server over a network.

17. The non-transitory computer-readable storage medium of claim 16 wherein the supplemental message content comprises content solely generated by the supplemental message server and is separate from the application content generated by the application that is currently executed on the network client and any other content served to the network client from the virtual desktop infrastructure server.

18. The non-transitory computer-readable storage medium of claim 17 wherein the defined screen region and the supplemental message content are composited on the virtual desktop infrastructure server with other content for the desktop display area and served to the network client for display.

19. The non-transitory computer-readable storage medium of claim 18 wherein the defined screen region and the supplemental message content are composited on the network client.

20. The non-transitory computer-readable storage medium of claim 16 wherein the supplemental message content is provided by a supplemental message server that is coupled to the network client via a communication channel different from a communication channel in which virtual desktop infrastructure server is using in configuring the defined screen region.

21. An apparatus for displaying supplemental message content on a client display in a virtualized network environment, the apparatus comprising:
   one or more computer processors; and
   a non-transitory computer-readable storage medium comprising instructions, that when executed, control the one or more computer processors to be configured for:
   providing a desktop display area for a virtual desktop environment to display a remote desktop view including application content from a set of applications running on a virtual infrastructure desktop server, wherein a desktop view process running on the virtual infrastructure desktop server is granted control over the client display, and wherein the desktop display area is transmitted to the client for display in a remote desktop according to a remoting protocol;
   responsive to allowing supplemental message content to the user, transforming, by the desktop view process using the control, the remote desktop view within the desktop display area provided to the client display using an affine transformation process that includes one or more of scaling and translation processes to reduce the remote desktop view to create a defined screen region by defining attributes for the defined screen region, wherein the defined screen region is reserved to display supplemental message content that is served by a supplemental message server apart from application content from the set of applications, wherein creating the defined screen region comprises:
   resizing a graphical user interface display area of the remote desktop view for providing the display of application content specified by the desktop view process for the client display according to the affine transformation process to occupy less than the entire available desktop display area to generate a scale-out display area within the desktop display area and outside of the remote desktop view that is not accessible to the set of applications; and
   rendering the defined screen region within the scale-out display area, the defined screen region being associated with a particular channel for directly receiving the supplemental message content;
   upon creating the defined screen region, configuring a display driver to make the defined screen region be persistent by communicating the attributes for the defined screen region by the desktop view process to the display driver;
   causing, using the display driver, display of an image of application content from an application in the set of applications running on the desktop server for display in the remote desktop view of the desktop display area in the remote desktop of the client display of a network client; and
   causing, using the display driver, display of the supplemental message content for display in the defined screen region in the remote desktop of the client display of the network client, wherein the display driver is configured to cause display of the supplemental message content such that the application content does not block the supplemental message content by using the attributes of the defined screen region that were provided by the desktop view process.

* * * * *